United States Patent
Flammer, III

(10) Patent No.: US 9,288,712 B2
(45) Date of Patent: *Mar. 15, 2016

(54) MULTI-CHANNEL MESH NODES EMPLOYING STACKED RESPONSES

(71) Applicant: Silver Spring Networks, Inc., Redwood City, CA (US)

(72) Inventor: George Flammer, III, Cupertino, CA (US)

(73) Assignee: SILVER SPRING NETWORKS, INC., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/683,206

(22) Filed: Apr. 10, 2015

(65) Prior Publication Data

US 2015/0215813 A1 Jul. 30, 2015

Related U.S. Application Data

(63) Continuation of application No. 12/207,358, filed on Sep. 9, 2008, now Pat. No. 9,025,584.

(51) Int. Cl.
*H04J 3/00* (2006.01)
*H04W 28/02* (2009.01)
(Continued)

(52) U.S. Cl.
CPC ......... *H04W 28/0263* (2013.01); *H04B 1/7143* (2013.01); *H04L 1/1628* (2013.01);
(Continued)

(58) Field of Classification Search
CPC ............... H04L 1/1628; H04L 2001/0093
USPC .......... 370/338, 345, 349, 389, 498; 709/242, 709/243
See application file for complete search history.

(56) References Cited

U.S. PATENT DOCUMENTS 6,647,002 B1 * 11/2003 Suda et al. .................. 370/335
7,310,670 B1 12/2007 Walbeck et al.
(Continued)

FOREIGN PATENT DOCUMENTS

EP 0981221 A2 2/2000
EP 1895701 A2 3/2008
(Continued)

OTHER PUBLICATIONS

Invitation to Pay Additional Fees, with Partial Search Report, dated Mar. 26, 2010.
(Continued)

*Primary Examiner* — Mang Yeung
(74) *Attorney, Agent, or Firm* — Buchanan Ingersoll & Rooney PC

(57) ABSTRACT

Rather than using a large number of transceivers (transmitter/receiver pairs) operating in parallel, Access Points with multiple channels are used to aggregate, or stack, transmitted response communications, e.g., transmitting multiple acknowledgements (ACKs) in a single packet to one or more sources of received packets. The method includes sending on a plurality of channels, by each of a plurality of respective first nodes, a communication to a second node, receiving on the plurality of channels, by the second node, the communication from each of the plurality of first nodes and sending, by the second node, a transmission that contains a response to each communication that was successfully received from each of the plurality of first nodes. The response to each of the plurality of first nodes is part of a single message sent by the second node.

19 Claims, 9 Drawing Sheets

(51) Int. Cl.
  *H04L 1/16* (2006.01)
  *H04B 1/7143* (2011.01)
  *H04L 12/743* (2013.01)
  *H04L 12/855* (2013.01)
  *H04L 12/865* (2013.01)
  *H04L 1/00* (2006.01)
  *H04W 84/18* (2009.01)

(52) U.S. Cl.
  CPC ........ *H04L45/7453* (2013.01); *H04L 47/2466* (2013.01); *H04L 47/6275* (2013.01); *H04L 2001/0093* (2013.01); *H04W 84/18* (2013.01)

(56) References Cited

U.S. PATENT DOCUMENTS

| | | |
|---|---|---|
| 7,469,297 B1 | 12/2008 | Kostoff, II et al. |
| 2001/0037398 A1 | 11/2001 | Chao et al. |
| 2004/0205105 A1* | 10/2004 | Larsson et al. ................ 709/200 |
| 2004/0208153 A1* | 10/2004 | Mizell et al. .................. 370/338 |
| 2005/0058149 A1 | 3/2005 | Howe |
| 2005/0210157 A1 | 9/2005 | Sakoda |
| 2007/0004347 A1 | 1/2007 | Sondur |
| 2007/0104223 A1 | 5/2007 | Lee et al. |
| 2008/0004044 A1 | 1/2008 | Simpson et al. |
| 2008/0056173 A1 | 3/2008 | Watanabe |
| 2008/0068979 A1 | 3/2008 | Visotsky et al. |
| 2009/0201798 A1* | 8/2009 | Lee et al. ....................... 370/216 |

FOREIGN PATENT DOCUMENTS

| | | |
|---|---|---|
| JP | 2000-069555 | 3/2000 |
| JP | 2007-129726 | 5/2007 |
| JP | 2008-060951 | 3/2008 |
| TW | 200601748 A | 1/2006 |
| WO | WO 01/82550 A2 | 11/2001 |

OTHER PUBLICATIONS

International Search Report and Written Opinion, dated May 25, 2010.

Chinese Office Action issued Apr. 18, 2013 by the Chinese Patent Office in Chinese Patent Application No. 200980142135.9 and English language of Chinese Office Action (9 pages).

Mexican Office Action issued May 8, 2013 by the Mexican Patent Office in Mexican Patent Application No. MX/a/2011/002569 (3 pages).

Taiwanese Office Action issued on Jun. 4, 2013 in corresponding Taiwanese Patent Application No. 098130211 (13 pages).

\* cited by examiner

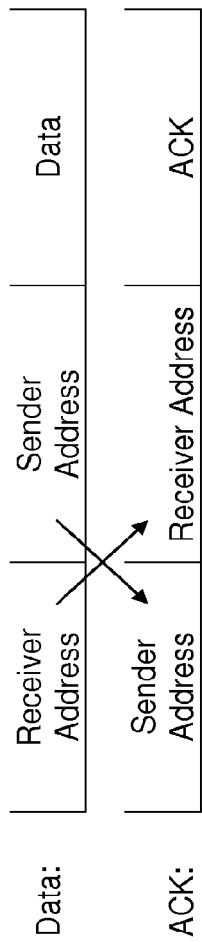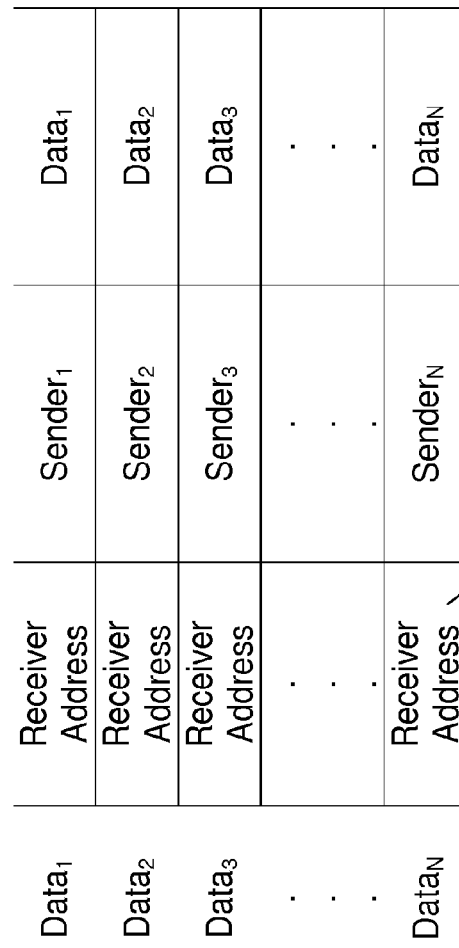
FIG. 3A
FIG. 3B

MULTI-CHANNEL MESH NODES EMPLOYING STACKED RESPONSES

RELATED APPLICATION

This application is a continuation of application Ser. No. 12/207,358, filed Sep. 9, 2008. The entire content of this application is hereby incorporated by reference in its entirety.

BACKGROUND

1. Field of the Invention

The subject matter presented herein relates generally to the field of communications networks, and in particular, to wireless mesh networks.

2. Description of Related Art

In a large mesh network that uses multiple media, e.g., separate frequencies in a radio frequency (RF) spectrum, some nodes can be typically much busier than other nodes and thus form bottlenecks in the mesh. Examples of these nodes include access points (APs) or gateways that are controlling endpoints in the mesh or are receiving information from a multiplicity of nodes.

While a possible solution to the bottleneck problem is to expand the number of APs, there are limitations to such an approach. For example:

1) cost increases almost linearly with the number of APs,
2) laws of physics impose limitations between transmitters and receivers that are closely co-located, and
3) regulations in unlicensed spectra restrict collaboration between unlicensed nodes for the purposes of eliminating mutual interference.

Regarding this latter point, limitations placed on Frequency Hopping Spread Spectrum (FHSS) devices certified under 47 CFR 15.247, which is promulgated by the U.S. Federal Communications Commission (FCC), (and more generally, any certified unlicensed devices worldwide), are designed to provide opportunities for sharing unlicensed portions of the RF spectrum in an radio-egalitarian manner. Power limits, channel occupancy (cumulative dwell time), bandwidths, etc., all have specified limits to permit co-existence of mutually compatible devices.

Some applications of these radios have included classic point-to-point communications. For example, IEEE Standard 802.11 "WiFi" has been developed to provide interoperable equipment with the purpose of transporting digital information over short distances. Applications requiring greater range have attempted to mesh multiple radios together to form a network where communications hop from node to node in a process called routing to travel from the source to the destination. Network operation within this mesh is performed in a peer-to-peer fashion, where network maintenance and overhead traffic is sent between all adjacent nodes in order to keep the network communicating efficiently and robustly.

Mesh networks have proven very successful, and many examples of large, geographically distributed networks exist. The architecture of these networks typically supports a process control model where there are just a few nodes, known as access points (APs), which provide access into and egress from the mesh network. A multiplicity of endpoint nodes in the mesh network can be accessed from these access point entry nodes. Requests and commands are sent through APs, and responses and acknowledgements are returned through them. When it is desired to communicate with a large number of endpoint nodes, the concentration of traffic at the APs may cause a traffic bottleneck in the mesh network.

Several schemes have been used to address these limitations. Some of these schemes are directed to the amount of data or the manner in which it is transmitted, such as:

Data compression (sending fewer bytes of data to reduce bandwidth requirements at the APs),
Autonomous messaging (sending data in only one direction), and/or
Coordinating or scheduling data traffic via both time (temporal) and prioritization (queuing techniques).

Other schemes are directed to the infrastructure of the mesh network, e.g., emplacing more APs within the wireless network coverage, in an attempt to solve the congestion problem. For instance, multiple APs might be operating in parallel at a particular location. However, this approach is burdened with linearly increasing, and often prohibitive, expense.

SUMMARY

Rather than using a large number of transceivers (transmitter/receiver pairs) operating in parallel, exemplary methods and systems disclosed herein utilize APs with parallel multiple channels, and aggregate, or stack, transmitted response communications, e.g., transmitting multiple acknowledgements (ACKs), in a single packet to one or more sources of received packets.

In one embodiment, a method of communicating in a network comprises sending on a plurality of channels, by each of a plurality of respective first nodes, a communication to a second node; receiving on the plurality of channels, by the second node, the communication from each of the plurality of first nodes and sending, by the second node, a transmission that contains a response to each communication that was successfully received from each of the plurality of first nodes. The response to each of the plurality of first nodes is part of a single message sent by the second node.

In another embodiment, a method of communicating in a network comprises monitoring, by a first node, a pre-determined channel at a pre-determined time; determining, by the first node, whether data has been received on the pre-determined channel at the pre-determined time; determining, by the first node, whether to forward received data to a single channel or multi-channel receiving node in the event data has been received; transmitting, by the first node, the received data to the multi-channel receiving node in the event of the determination that the data is to be sent to the multi-channel receiving node; monitoring, by the first node, a pre-determined response channel once the data has been transmitted to the multi-channel receiving node; determining, by the first node, by monitoring the pre-determined response channel, whether the first node has received a response for the transmitted data, the response being transmitted by the multi-channel receiving node and re-transmitting, by the first node, the data to the multi-channel receiving node in the event the first node determines it has not received a response from the multi-channel receiving node.

BRIEF DESCRIPTION OF THE DRAWINGS

As will be realized, different embodiments are possible, and the details disclosed herein are capable of modification in various respects, all without departing from the scope of the claims. Accordingly, the drawings and descriptions are to be regarded as illustrative in nature and not as restrictive. Like reference numerals have been used to designate like elements.

FIGS. 3A, 3B, 3C and 3D illustrate exemplary response formats for incoming and responsive packets at a node.

DETAILED DESCRIPTION

The methods and systems described herein generally pertain to mesh networks in which two-way communications take place between a sending, or source, node and a receiving, or destination, node. One instance of a two-way communication occurs when the source node sends a data packet to the destination node, and the destination node responds with an acknowledgement, or "ACK" packet, to inform the source node that the data packet was successfully received. In accordance with a typical network protocol, if the source node does not receive the ACK packet within a certain period of time after sending the data packet, it might re-send the data packet at regular intervals until either an ACK packet is received or a time-out condition occurs.

Other examples of two-way communications are also prevalent in a typical network. For instance, a source node might send a request to a destination node, such as a gateway or access point, for a certain type of information relating to the operation of the network. This information could be a routing table, a maintenance update, an IP address, etc. In response to each such request, the destination node returns information responsive to the request, or a form of error message indicating that it is unable to comply with the request.

Conventionally, the two-way communications between the source and destination nodes occurred in a one-to-one manner. Namely, for each message, e.g., packet, received at the destination node, it sends a unicast reply to the source node. In accordance with exemplary methods and systems disclosed herein, a one-to-many format may be employed for the reply transmissions, to reduce bottleneck issues. To facilitate an understanding of the principles upon which the methods and systems are based, exemplary embodiments are described hereinafter with reference to an acknowledgement as the responsive transmission by the destination node. It will be appreciated, however, that these principles are equally applicable to other kinds of responsive transmissions that are returned to the source node from the destination node.

Figure 1:
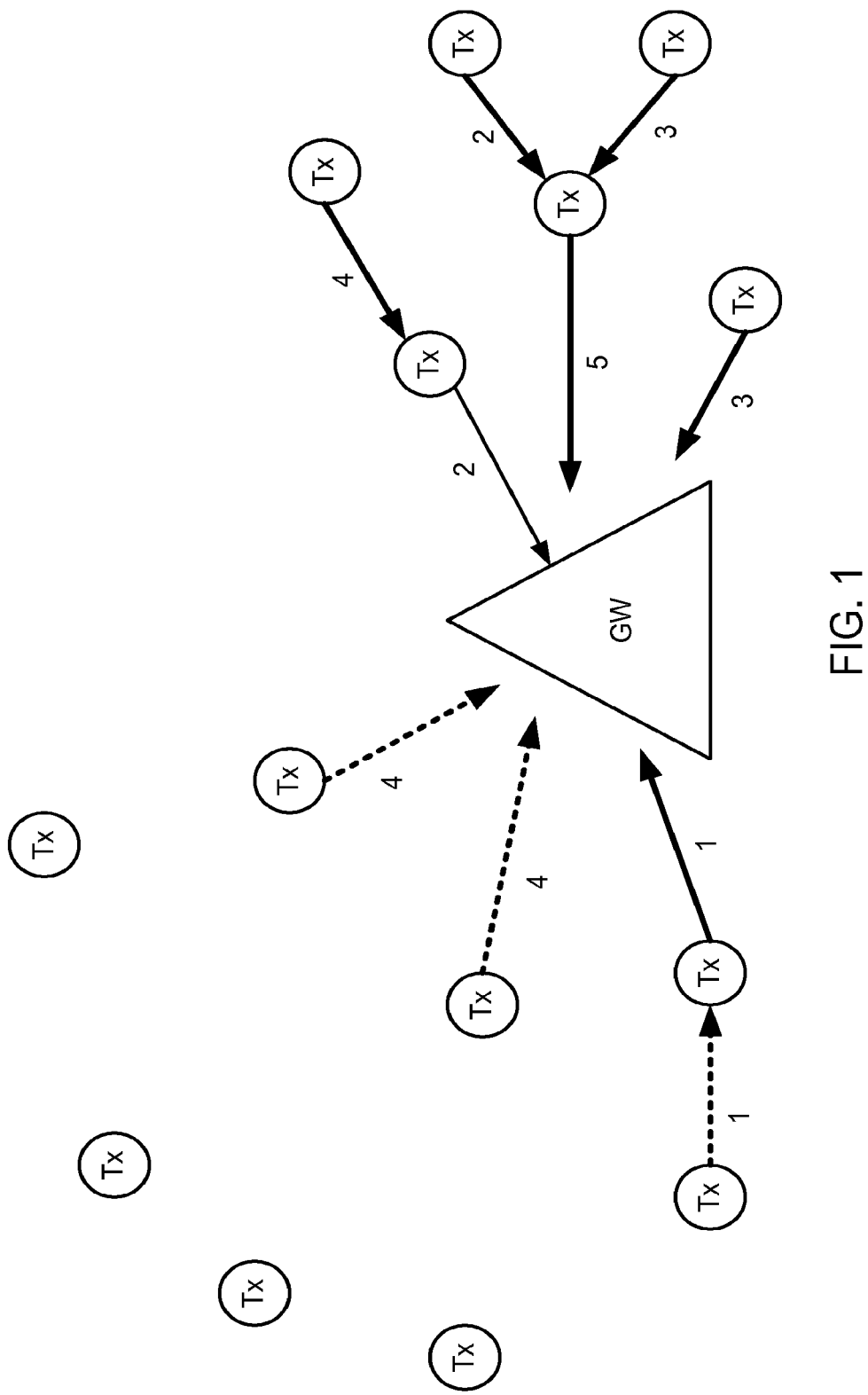
FIG. 1 is a schematic representation of communications in a system including a gateway in an RF mesh network.

FIG. 1 is a simple representation of a canonical radio frequency (RF) mesh network 100. The network illustrated in FIG. 1 includes at least one access point, which can be a gateway GW that functions as an interface between the mesh network 100 and another network, e.g., a wide-area network (not illustrated). The gateway GW includes a transmitter and a receiver with the capability to receive signals transmitted on at least one, but more preferably several frequencies. The transmitter enables the gateway to communicate with any other transceiver within a suitable signal propagation range. In one embodiment, the gateway may be surrounded by a "sea" of standard single-transmitter/single-receiver transceivers, identified by the symbol "Tx" in FIG. 1. The transceivers TX may represent, for example, meter nodes in a utility network and the gateway GW may provide, for example, access to various back office functions associated with the meter nodes in the utility network.

As shown in FIG. 1, there can be several transceivers that communicate with the gateway. In this embodiment, the transceivers transmit to the gateway one at a time. These transmissions and their order are indicated by numbered lines in FIG. 1. Solid lines indicate successfully received transmissions, either from a transceiver to the gateway or between transceiver nodes acting as relays for each other. After each successful transmission, the gateway immediately responds to the sending transceiver with an acknowledgement. Thus, when a data packet is received in time slot 1, the gateway responds with an ACK packet. Then, if another data packet is received in time slot 2, the gateway sends an ACK packet to the transceiver that transmitted that packet. The ACK packets are sent one at a time, to the individual source nodes from which they originated.

Broken lines in FIG. 1 indicate failure. In a densely interconnected mesh network, failures can result from two sources: packet collisions and unavailability of the intended receiver. Packet collisions may result from two or more nodes transmitting on the same frequency and in sufficient time coincidence such that their respective packets overlap and neither transmission is received successfully at the intended receiver. This condition is illustrated by the broken lines jointly targeting the gateway in time slot 4.

Receiver unavailability failures may happen when the intended receiver is not able to receive signals on the transmission frequency during the time required to receive a packet. This situation may arise when the intended receiver is on a different frequency engaged in receiving a packet from another node, for example in a network that employs a frequency-hopping protocol. As another example, the time slot 1 lines in FIG. 1 show a successful (solid line) transmission to the gateway and a failed (broken line) transmission targeted to that same receiver, which is off channel while it is communicating to the gateway.

These access failure conditions may be mitigated through scheduling, which may be effective when the data traffic is deterministic. Scheduling may be less effective when the data traffic is unpredictable, e.g., when the data traffic is generated autonomously or reactively.

Also, as depicted in FIG. 1, there may be multiple successful transmissions on time slot 2. In a frequency-agile mesh network, an embodiment of which is disclosed herein, non-adjacent nodes may occupy the same frequencies at the same time, naturally forming and enjoying frequency reuse capability.

As shown, the serialization of packets being sent to the gateway may form a bottleneck in the RF mesh network. Each transceiver having a direct link to the gateway must send its message(s) at a unique time, either scheduled or un-contended, to be successfully received. After each message is received, the gateway responds before moving on to the next one. The gateway may be largely architecturally unique, in that it may provide access to and egress from the RF mesh network. Thus, the limits imposed by a gateway's receiver and transmitter may dominate the performance of the RF mesh network.

Figure 2:
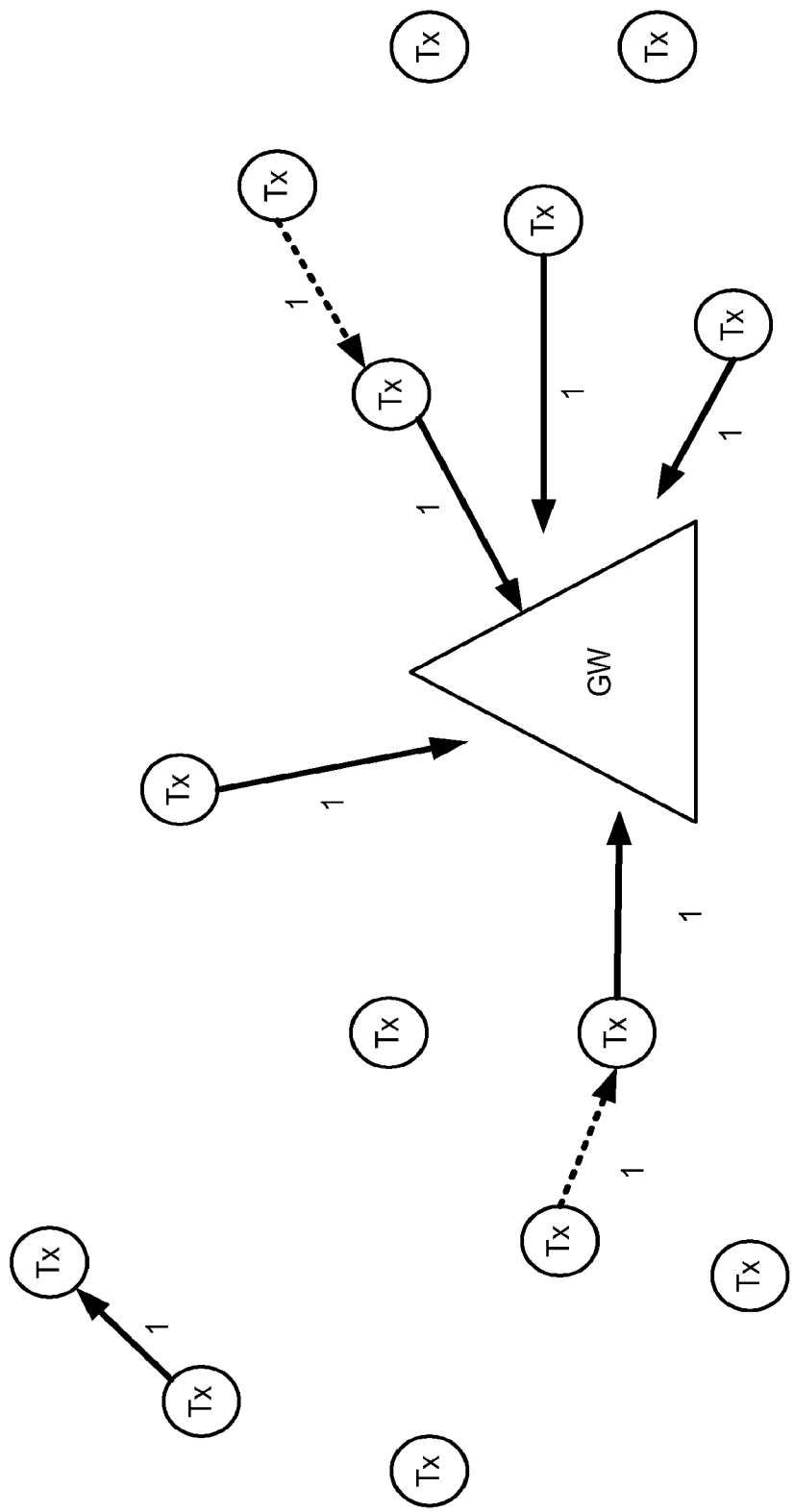
FIG. 2 is a schematic representation of multi-channel communications in an RF mesh network.

To solve this problem, FIG. 2 illustrates transmissions within an exemplary embodiment of a multi-channel node. In this embodiment, a node, e.g. a gateway, is configured to receive on multiple channels at the same time in an RF mesh network. Packets may be sent on different frequencies so that they do not collide in the frequency domain, even though they may overlap in the time domain. As depicted in FIG. 2, a multiplicity of messages are being received at the gateway during time slot 1.

Non-multi-channel devices (e.g., the transceiver nodes Tx shown in FIG. 2) are not able to receive and transmit at the same time. Therefore, transmissions directed to a simultaneously transmitting node may fail.

The receipt of incoming data packets at the same time but on different frequencies helps to prevent frequency spectrum collisions. However, it may place any possible ACKs (back to the sending nodes) into temporal collision situations. In the embodiment of FIG. 1, the ACKs ideally are transmitted immediately upon the receipt of the relevant data packet. However, with the multi-channel node of FIG. 2, this may not be possible because the gateway cannot transmit while it is receiving, and vice versa.

FIG. 3A illustrates a typical sequence for receipt of a packet and acknowledgement at a node. A sending node transmits a data packet containing the address of the receiving node to which the packet is addressed, as well as the sending node's address, and the data to be transmitted. The node to which the packet is addressed, e.g., the gateway, creates an ACK packet by transposing the sender's and receiver's addresses, and adding an acknowledgement indicator. The receiving node then transmits the ACK packet back to the original sending node.

When multiple packets are being received at different frequencies in the same time slot, it may not be possible for the receiving node to create and immediately return an ACK packet in this manner. To address this situation, the ACKs are accumulated, or stacked, and sent out in unison as part of a single responsive packet that is transmitted by the receiving node. FIG. 3B shows the concept of a stacked ACK packet. In one embodiment, sending nodes may use, for example, the same format for a data packet as shown in FIG. 3A. In the example of FIG. 3B, however, the gateway may be configured to receive the packets transmitted by sending nodes on multiple channels at the same time, as in the embodiment of FIG. 2. FIG. 3B depicts an example in which N data packets are received at the gateway. In response, a single ACK packet is created. This packet contains a broadcast address that is recognized by all of the nodes, together with the address of the receiving node. The packet also contains an identifier for each of the sending nodes 1 to N from which a data packet was successfully received. In response to receipt of such a broadcast packet, each node looks for its identifier in the packet, and if it is found, treats the packet as an ACK packet.

FIG. 3C shows an exemplary embodiment of a frame structure for a stacked ACK packet. In this example, the frame includes a field to identify it as an ACK type of packet, which follows the broadcast address and the responding node's address. However, this frame type field may not be necessary. For instance, the sending node may recognize that any broadcast frame received from the destination node within a certain time period, which contains its identifier, constitutes an ACK packet.

There may be several non-limiting ways to stack the ACKs in the responsive packet, denoted hereinafter as a "meta-ACK". Various examples are provided below:

i. A meta-ACK may contain full 8-byte MAC addresses of the sources of all received data packets inserted in the order the data packets were received.

ii. A meta-ACK may have a pre-agreed single byte or short address of the source of each data packet inserted in the order received. Short addresses may be pre-allocated addresses far shorter than the 8 byte MAC addresses used for unicast packets. For instance, the short address might be the last byte of the full MAC address, or a hash of the MAC address. This abbreviation of the addresses may result in halving or quartering the size of the meta-ACK.

iii. Rather than using order of receipt, the addresses can be emplaced in a priority order that is based on a priority associated with the received packet. For instance, priority may be based on the nature of what the sending node is transmitting, such as a report of trouble, or "last gasp" transmission before a sending node shuts down. Alternatively, an order may be based on priorities associated with particular sending nodes.

iv. The addresses can be emplaced in an order reflecting other criteria, such as the foreknowledge of the source node's frequency hopping pattern.

v. The addresses can be emplaced in numeric order so that a listening node can determine earlier in the meta-ACK whether the node's data was received. For example, the listening node may determine the absence of its ACK within the meta-ACK if, for example, it is assigned short Address 5 and it receives addresses 2, 3, 7, etc. The node is able to determine, when it receives address 7, that the node's data packet was not received because the ACK to it is absent.

In some cases, the response to an incoming request my take an appreciable amount of time to fulfill, which contributes to the bottleneck at a busy AP that receives such a request. Examples of such requests include requests for updates on the executable code image of a node, requests for node routing table information, security alerts (e.g. identification of nodes whose authorization cannot be confirmed), requests for timing information (drift rates and absolute time or frequency), etc. In one embodiment, these types of requests can be referred to a different node that has a better ability to handle them. To do so, when the multi-channel AP that received the request prepares its response, it may include a command in the set of stacked responses, instructing the source node to go to a different node for fulfillment of its request. Upon receipt of this command, the source node then resends the request, addressed to the other node identified in the command.

The other node to which the request is redirected may be another multi-channel receiving node that is established for the purpose of handling a distinct class of endpoint nodes. This may be the case, for example, when separate infrastructure is emplaced to support Distribution Automation (DA) nodes in a utility network. DA nodes have higher priority to a utility than nodes associated with meters that monitor consumption, since they are nodes that switch and control the connectivity of the power grid. Thus, the DA infrastructure can be kept partially 'separate' to enforce policies designed to provide faster, more reliable, or more secure communication to these DA nodes.

Stacked responses other than ACKs, such as the command capability described above, require a different frame format, because the response includes data that is intended for a particular source node. In one embodiment, stacked responses of this type may be implemented via data packets that contain Type-Length-Value (TLV) elements. Within data communication protocols, optional information may be encoded as a TLV element inside the protocol. Each TLV element comprises the following fields:

Type: A numeric code that indicates the kind of field that this element of the message represents, e.g. a command.

Length: The size of the value field (typically in bytes).

Value: Variable sized set of bytes that contains data for this TLV element of the message, e.g. the command itself.

The type and length fields may be fixed in size (typically 1-4 bytes), whereas the value field is of variable size to accommodate the data being transmitted.

An exemplary format for a stacked response frame that employs TLV elements is illustrated in FIG. 3D. As with the stacked ACK frame of FIG. 3C, the first three fields comprise the broadcast address, the address of the multi-channel node that is sending the responses, e.g. a gateway, and the frame type, in this case "TLV". The payload portion of the frame contains a sequence of identifiers S1, S2, . . . SN for the requesting nodes, e.g. their short addresses, with each identifier immediately followed by the TLV that is intended for the corresponding node. When parsing this type of frame, the nodes check the first identifier to determine if it is theirs. If not, they examine the length field of the TLV following the identifier, which provides an offset for the next identifier in the series. This process continues, until a node recognizes its particular identifier, or reaches the end of the frame. When a node finds a match for its identifier, it examines the entire TLV element following that identifier to obtain the response that was sent to it in the stacked frame.

In one embodiment, the gateway can send a set of TLVs containing any type of network configuration information. This information may include, for example, the gateway's globally routable IPv6 prefix, the gateway's MAC address, DNS server address, routing updates, network timing information and any other variables relating to OSI model Layer 2/Layer 3 routing.

It is to be noted that there can be differences between a meta-ACK and a beacon packet. For example, the information included in a classic broadcast is generally not targeted to a specific node, i.e., the information is about the transmitting node and distributed to any and all receivers within range. By way of example, a frame format of a beacon is given below:

filtered signals are then converted into a digital signal in an A/D converter 15, and the resulting digital signal is supplied to a DSP 16. The input to the DSP 16 may include a mixture of all of the transmitted signals that were received simultaneously on the different channels. The DSP operates to separate this mixture into individual signals. The output of the DSP engine is the recovered binary data, which may be indexed and serialized for presentation to a protocol processor in an adjacent processor (not shown). An example of a commercially available DSP is a SPARTAN-series field-programmable gate array DSP manufactured by Xilinx, Inc. of San Jose, Calif.

Figure 4A:
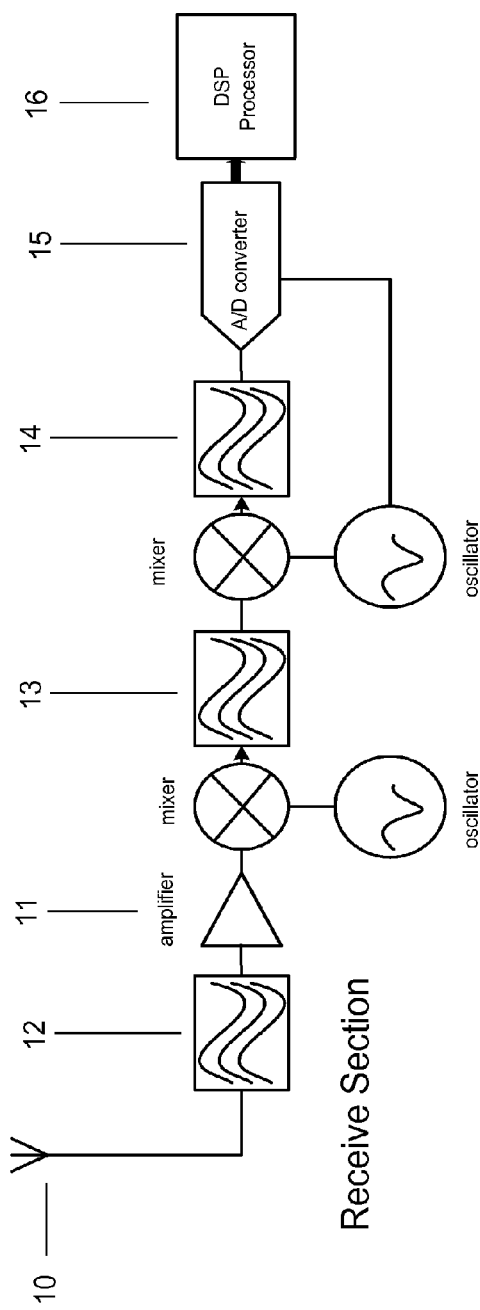
FIGS. 4A and 4B are block diagrams exemplary embodiments of a receiver and a transmitter in a multi-channel gateway.

In one embodiment, the exemplary multi-channel system shown in FIG. 4A allows for processing a relatively large (multiple channel) spectrum to baseband in order to be processed by the DSP engine. Using Fast Fourier Transform (FFT) techniques, the DSP 14 creates FFT bins for each of the many channels within the down-converted spectra. In one embodiment, there may be up to 240 channels. In an embodiment using a carrier frequency around 900 MHz, there may be around 83 channels. These bins may act as, in effect, separate receivers for each channel. The received data in each channel is separately processed to determine whether it constitutes a successfully received packet. If so an ACK, or other suitable response, is prepared to be accumulated with the responses for other packets received at the same time, and returned in a meta-ACK or other similar packet containing stacked responses.

Figure 4B:
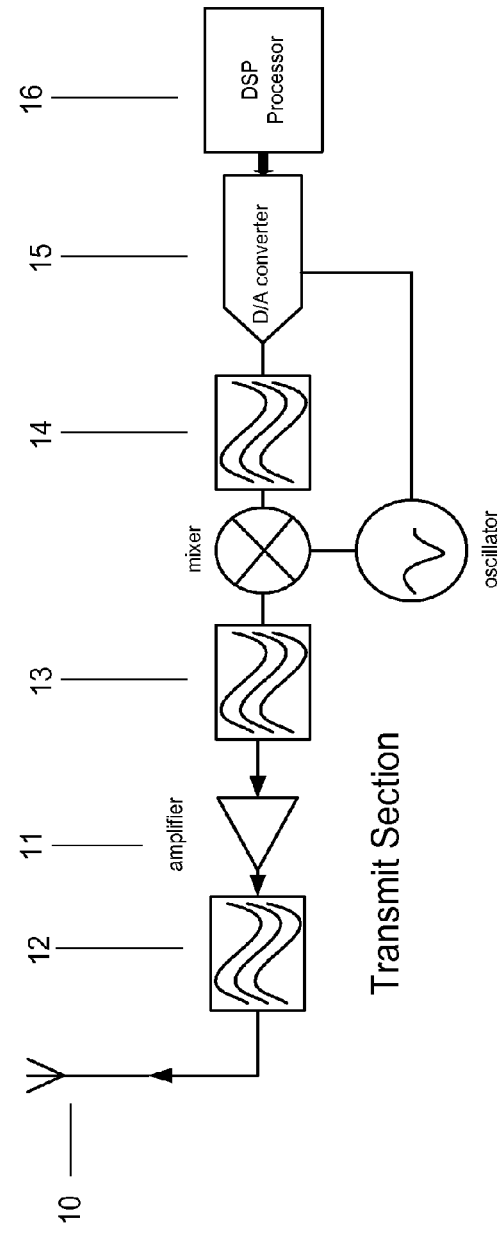

FIG. 4B shows an exemplary multi-channel transmit section of a multi-channel gateway. Components similar to those used in the receive section of FIG. 4A can also be used in the transmit section. Additionally, digital processing software used in the receive DSP may be used in the transmit DSP. For

| PHY HEADER (12) | Frame Control (1) | Source MAC (8) | Epoch Tick TLV (4) | Routing Info TLV (N) | Other TLVs (N) | CRC-32 (4) |
| --- | --- | --- | --- | --- | --- | --- |

The meta-ACK, similar to a beacon message, has a broadcast destination address or, more efficiently, no destination address, where the broadcast type is implicit, but the Frame-Type is ACK. In this example, those nodes that (1) are listening on the frequency of the meta-ACK, and (2) have recently transmitted data are interested in this meta-ACK. The data in the meta-ACK is thus about the data senders, and not the transmitting nodes.

A multi-channel node can be implemented in a variety of ways. For instance, it might consist of a single transmitter and a plurality of receivers that are each tuned to a different frequency over which communications might be received. Another approach that is less hardware intensive, and therefore less expensive, can employ a digital signal processor (DSP) to differentiate multiple signals that are received simultaneously. FIGS. 4A and 4B show an exemplary system diagram for a multi-channel node that is based on this latter implementation.

Referring to FIG. 4A, which shows an exemplary receive section of a multi-channel gateway, multiple RF signals that are simultaneously transmitted by nodes on different channels, i.e., with different respective carrier frequencies, are received at an antenna 10, and undergo suitable amplification 11 and filtering 12, 13 and 14 to segregate the signals at the desired frequencies from unwanted signals and other noise. In one embodiment, the antenna 10 may be configured to receive RF signals in the unlicensed band around 900 MHz. The example, the receive DSP may use FFT software while the transmit DSP may use inverse FFT software.

In the exemplary transmit section, multiple transmit signals may be produced by configuring the Fourier coefficients in the DSP, which will be known to a person of skill in the art of digital signal processing. For example, if the amplitude coefficient is set to 0, no energy is output on that channel or frequency. If the amplitude coefficient is set to 0.25, and three other coefficients are similarly set to 0.25, then four signals of equal strength may be produced. The amplitude coefficients may be established based on the signal energy that is estimated to be required to adequately cover a given signal path to the node targeted on the particular channel.

Figure 5:
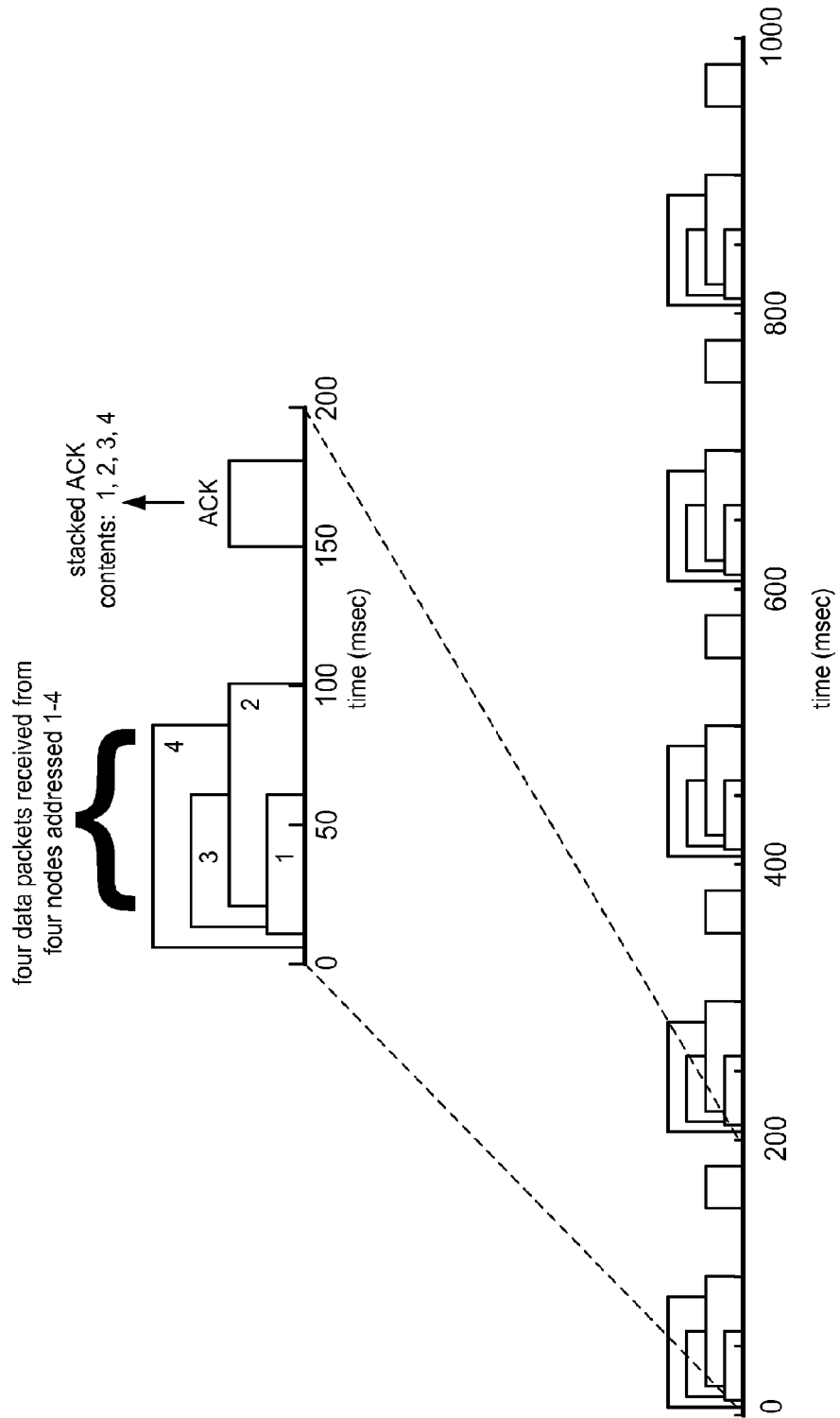
FIG. 5 is an exemplary timing sequence diagram for a multi-channel access point according to one embodiment.

FIG. 5 shows an exemplary timing sequence diagram for a multi-channel access point according to one embodiment. In an exemplary mesh network, data may be transmitted, for example, at 100 kbps, which is approximately 10 bytes/ms. Applying this correspondence, large data packets, which in this example may be 500 bytes, could take 50 ms to be transmitted; larger packets, e.g., 1500 bytes, could take 150 ms, etc.

As shown in FIG. 5, a second of time, i.e., 1000 ms, in an exemplary mesh network may be divided, for example, into 200 ms slots, which may be further divided into a 150 ms sub slot for inbound data to an access point and a 50 ms sub slot for outbound data from an access point.

The exemplary timing sequence arrangement shown in FIG. 5 thus provides that each second of time may include five multi-node exchange slots. For example, nodes 1-4 may simultaneously communicate on separate frequencies to an access point during a 150 ms inbound sub-slot of a 200 ms slot. The access point may transmit a response to each communication that was successfully received from nodes 1-4 during a 50 ms outbound sub-slot. As shown in this example, the response from a multi-channel access point to each of nodes 1-4 may be part of a single message sent by the access point. A similar sequence may continue during the other 200 ms slots. In this example, the multi-channel node, e.g., access point, transmits a responsive packet every 200 ms. This packet contains the stacked responses, e.g., ACKs, for all inbound packets that were successfully received during the inbound sub-slot of the 200 ms slot.

Figure 6A:
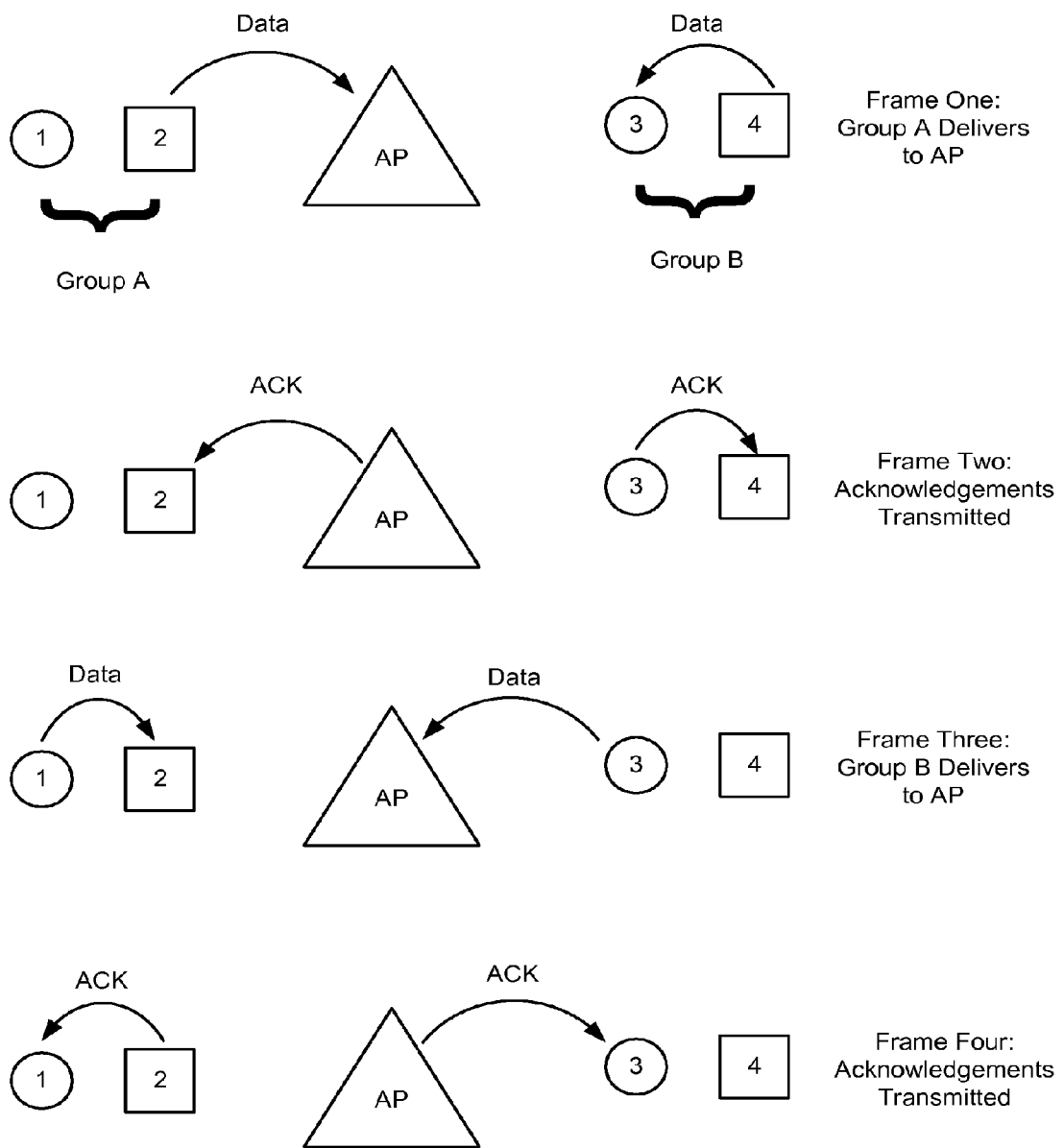
FIGS. 6A and 6B are timing diagrams of packet delivery cycles.
Figure 6B:
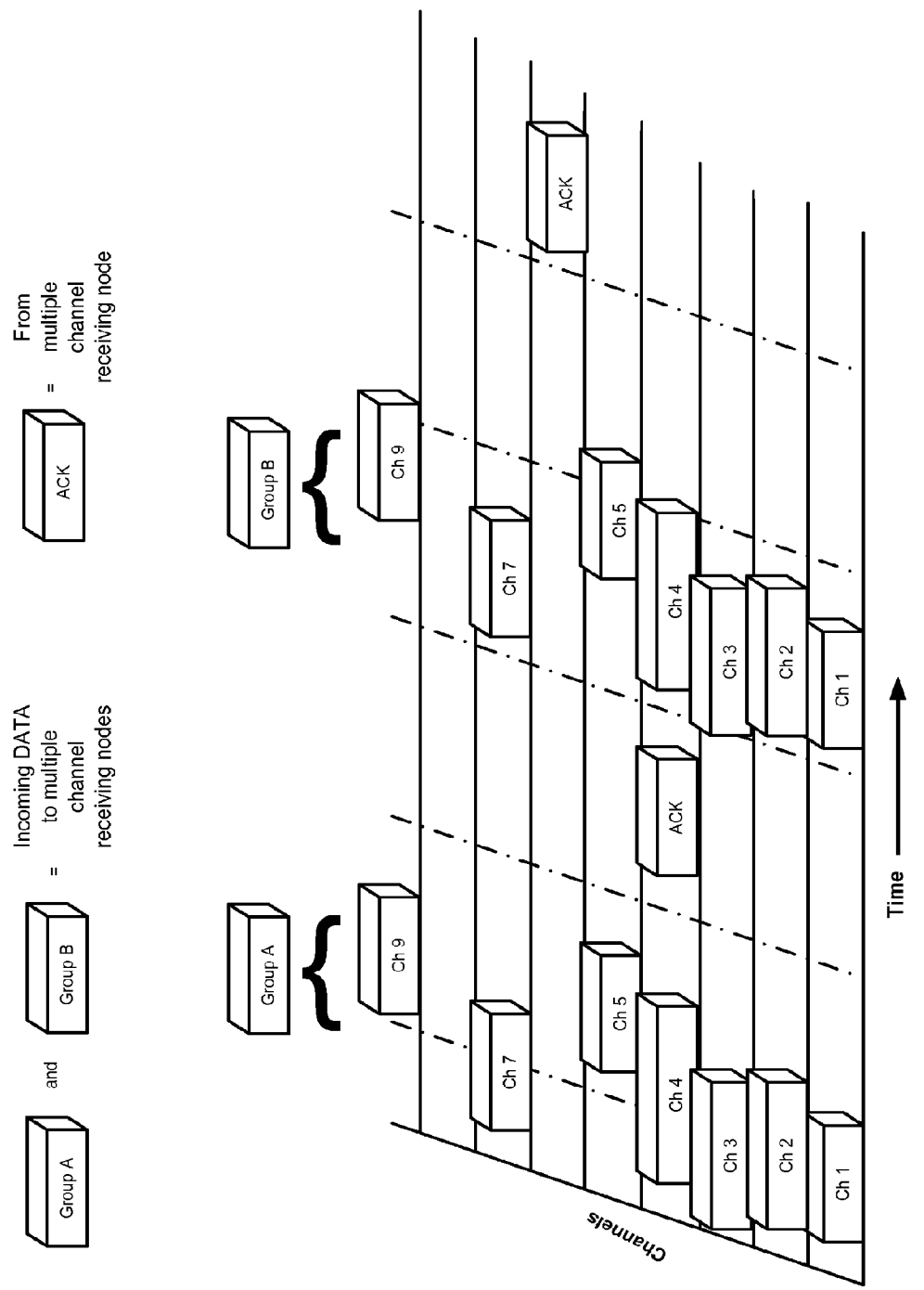

Some nodes may be delivering data to the multi-channel access point, while others that are receiving data are unable to transmit to the access point. Consequently, the nodes can be thought of as naturally forming two groups alternately delivering data and then receiving more data in a cyclic fashion. FIGS. 6A and 6B show examples of these packet delivery cycles.

Referring to FIG. 6A, Frame One shows an example of packets being delivered to the AP by data-holding nodes labeled "2" that are adjacent to the AP. Nodes adjacent to the AP may be capable of communicating directly with the AP. These data-delivering nodes are part of Group A. Other nodes adjacent to the AP that do not have data to forward, labeled "3", receive data from nodes 4 further out in the mesh network, e.g., not adjacent to the AP. Nodes 3 and 4 are part of Group B.

Frame 2 shows acknowledgements being sent to the nodes that just delivered data packets. In this example, for Group A, the AP sends an ACK, or stacked ACK, to the node or nodes 2 that sent data to the AP. For Group B, the ACKs may be sent by the node 3 that received the data to the sending nodes 4.

Frame 3 shows an example where data from Group B nodes is delivered to the AP while data from more remote Group A nodes 1 is delivered to nodes 2 adjacent to the AP.

Frame 4 shows an ACK process similar to Frame 2, but in this example, the AP sends an ACK or stacked ACK to the Group B adjacent nodes 3 while for Group A, the ACKs may be sent by the nodes 2 adjacent to the AP.

FIG. 6B is an example of the Group A and Group B packet delivery cycles in a timing sequence similar to that shown in FIG. 5. FIG. 6B shows data from Group A nodes being received at the AP on multiple channels during a time sub-slot for inbound data and a subsequent ACK or stacked ACK transmission during a time sub-slot for outbound data. After the Group A time slot, a similar process occurs for the Group B nodes.

In one embodiment, beacon packets may be used to convey timing synchronization for the timing sequences described above. A beacon packet could be sent by the multi-channel nodes to indicate the times and channels at which data packets can be received and when and where the corresponding ACKs will be sent. These beacon packets may be sent at pre-specified times and may be available to all nodes within direct range of the multiple-channel receiving node, e.g., the nodes immediately adjacent to the multi-channel nodes.

If the sender of the original data packet does not receive an ACK, it may be because:
1) the multi-channel receiving node did not receive the data packet in the first place, or
2) the ACK was not successfully received by the original data sender.

In either case, the sender of the original data packet may resend the data, at another time and on another channel. Such actions may be taken to improve the probability of success for subsequent data transmissions.

The failure of the sender of the request to receive the ACK may result in the request being re-sent. This additional request may be managed by the multi-channel receiving node by sending an ACK again, but not passing along any request in the re-sent packet to a target node. Alternatively, a target node may operate to drop the duplicate request when forwarded by the multi-channel receiving node.

Figure 7:
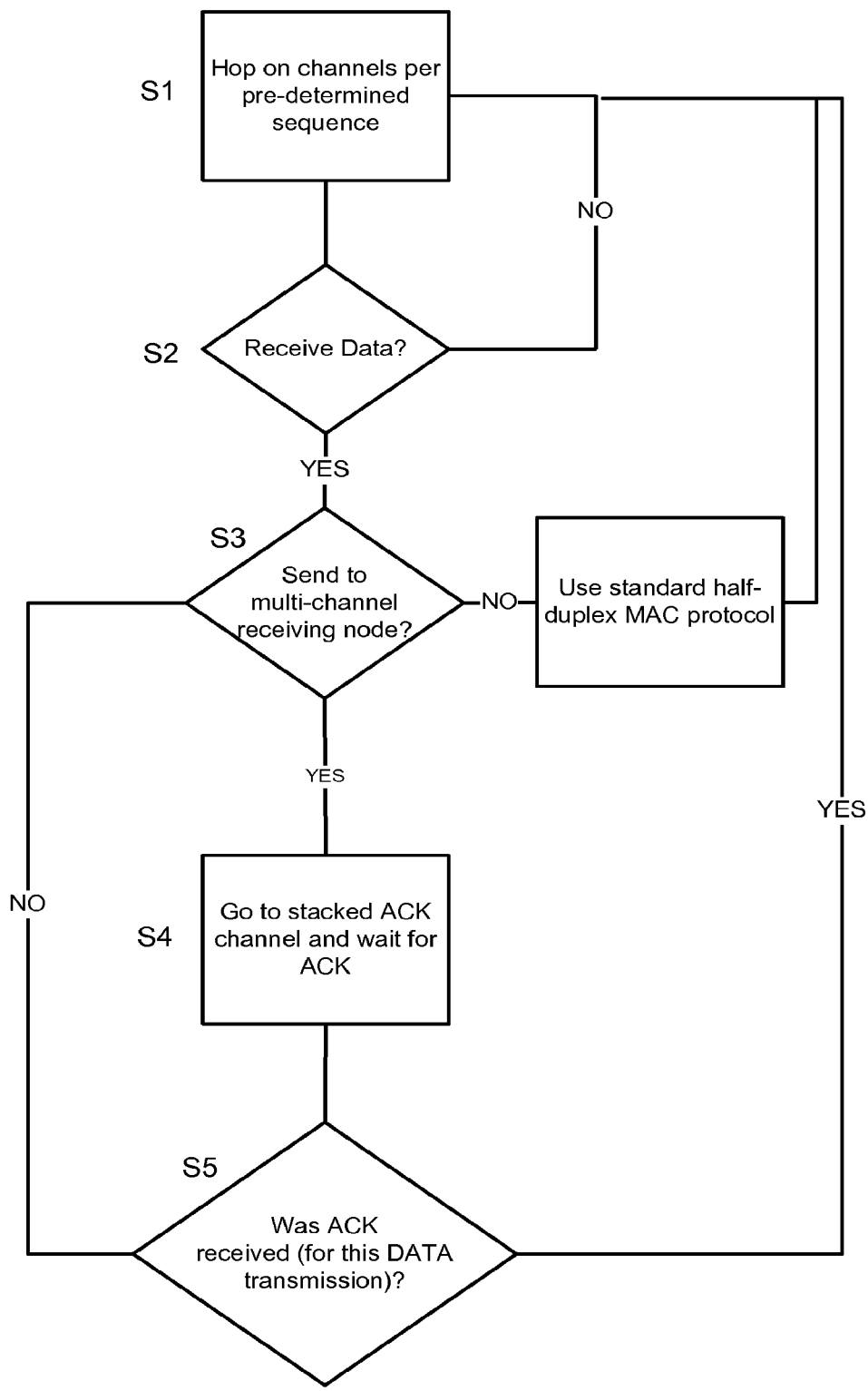
FIG. 7 is an exemplary process flow diagram for a mesh network with multi-channel access points.

FIG. 7 shows an exemplary process flow diagram for a mesh network with multi-channel access points. In step S1, a node listens to a pre-determined channel at a pre-determined time according to a sequence conveyed to the node by a beacon packet, for example.

In step S2, if no data is received, the node returns to following the pre-determined channel and timing sequence.

If data is received, the process proceeds to step S3. In step S3, the node determines whether it is to forward the received data to a single channel or multi-channel node. If the determination is not to forward the data to a multi-channel node, the data may be sent using a standard half-duplex MAC protocol, for example.

In step S4, if the data is to be sent to a multi-channel node, once the data is transmitted, the sending node may then go to a pre-determined stacked ACK channel to wait for its particular ACK. As mentioned, the channel and timing for receiving stacked ACKs may be conveyed by beacon packets.

In step S5, the original sending node determines whether an ACK was received for a particular data transmission. If an ACK is received, the process may return to step S1 and proceed as described above. If an ACK is not received, the process may return to step S3 where the node may re-send the data to the multi-channel node and then proceed to step S4 to listen for an ACK.

In one embodiment, to meet the certification criteria for 47 CFR 15.247, the AP may send only one packet at a time, but there may be no limitation on the number of packets it can receive simultaneously. Thus, in one embodiment, any node may send a packet on any channel on which the AP may receive, which in another embodiment is all the channels capable of being used in a particular system. Thus, in a mesh network with plentiful endpoints, e.g., sensors or other process control devices, the exemplary embodiments described herein may lessen the impact of limitations of known systems, e.g., the availability of hardware/software in the inbound direction, to receive a packet.

The AP may receive packets within radio propagation range, check them for correctness and build a response packet—an ACK. In one embodiment, received packets are acknowledged, unless explicitly requested not to. Another embodiment may include ordering the acknowledgement data by some priority or other scheme that, by its order conveys information or adds efficiency. This meta-packet may be sent on a known slot, i.e., a frequency/time couplet, and may serve to complete a multi-packet handshake of a standard packet exchange.

The above description is presented to enable a person skilled in the art to make and use the systems and methods described herein, and it is provided in the context of a particular application and its requirements. Various modifications to the embodiments will be readily apparent to those skilled in the art, and the generic principles defined herein may be applied to other embodiments and applications without departing from the spirit and scope of the claims. Thus, there is no intention to be limited to the embodiments shown, but rather to be accorded the widest scope consistent with the principles and features disclosed herein.

What is claimed is:

1. A method of communicating in a network, comprising:
receiving, at a first node, a communication from each of a plurality of second nodes, the communications being received via different respective channels; and
sending, by the first node, a transmission that contains a response to each communication that was successfully received from each of the plurality of second nodes, wherein the response to each of the plurality of second nodes is part of a single message sent by the first node;
wherein at least one of the responses in the single message includes network routing information usable by at least one of the plurality of second nodes to modify its network routing configuration for operation within the network,
wherein each response from the first node to the plurality of second nodes is ordered in the transmission based on at least one of (i) information contained in a received packet, and (ii) a priority associated with the node from which the received packet was received,
wherein the message sent by the first node comprises identifiers that respectively correspond to each of the plurality of second nodes whose communication was successfully received by the first node,
wherein the identifiers are arranged in the message in accordance with the order of each response from the first node to the plurality of second nodes in the transmission, and
wherein each response from the first node to the plurality of second nodes is ordered in the transmission based on a pre-allocated address shorter than a MAC address corresponding to each of the plurality of second nodes that sent a successfully received packet.

2. The method of claim 1, wherein the communication from each of the plurality of second nodes to the first node comprises data packets comprising identification headers of a source and a destination.

3. The method of claim 1, wherein each response from the first node to the plurality of second nodes comprises an acknowledgement.

4. The method of claim 1, wherein the pre-allocated address is a pre-determined byte of the MAC address corresponding to each of the plurality of second nodes that sent a successfully received packet.

5. The method of claim 1, wherein the pre-allocated address is a hash of the MAC address corresponding to each of the plurality of second nodes that sent a successfully received packet.

6. A method of communicating in a network, comprising:
receiving, at a first node, a communication from each of a plurality of second nodes, the communications being received via different respective channels; and
sending, by the first node, a transmission that contains a response to each communication that was successfully received from each of the plurality of second nodes, wherein the response to each of the plurality of second nodes is part of a single message sent by the first node;
wherein at least one of the responses in the single message includes network routing information usable by at least one of the plurality of second nodes to modify its network routing configuration for operation within the network,
wherein each response from the first node to the plurality of second nodes is ordered in the transmission based on at least one of (i) information contained in a received packet, and (ii) a priority associated with the node from which the received packet was received,
wherein the message sent by the first node comprises identifiers that respectively correspond to each of the plurality of second nodes whose communication was successfully received by the first node,
wherein the identifiers are arranged in the message in accordance with the order of each response from the first node to the plurality of second nodes in the transmission, and
wherein each identifier comprises an eight-byte MAC address.

7. The method of claim 6, wherein the communication from each of the plurality of second nodes to the first node comprises data packets comprising identification headers of a source and a destination.

8. The method of claim 6, wherein each response from the first node to the plurality of second nodes comprises an acknowledgement.

9. The method of claim 6, wherein each response from the first node to the plurality of second nodes is ordered in the transmission based on a priority associated with content of the received packet.

10. The method of claim 9, wherein each response from the first node to the plurality of second nodes is ordered in the transmission based on a priority associated with content of the received packet.

11. A method of communicating in a network, comprising:
receiving, at a first node, a communication from each of a plurality of second nodes, the communications being received via different respective channels; and
sending, by the first node, a transmission that contains a response to each communication that was successfully received from each of the plurality of second nodes, wherein the response to each of the plurality of second nodes is part of a single message sent by the first node;
wherein at least one of the responses in the single message includes network routing information usable by at least one of the plurality of second nodes to modify its network routing configuration for operation within the network,
wherein each response from the first node to the plurality of second nodes is ordered in the transmission based on at least one of (i) information contained in a received packet, and (ii) a priority associated with the node from which the received packet was received,
wherein the message sent by the first node comprises identifiers that respectively correspond to each of the plurality of second nodes whose communication was successfully received by the first node,
wherein the identifiers are arranged in the message in accordance with the order of each response from the first node to the plurality of second nodes in the transmission, and
wherein each identifier comprises an address shorter than an eight-byte MAC address.

12. The method of claim 11, wherein the communication from each of the plurality of second nodes to the first node comprises data packets comprising identification headers of a source and a destination.

13. The method of claim 11, wherein each response from the first node to the plurality of second nodes comprises an acknowledgement.

14. The method of claim 11, wherein each response from the first node to the plurality of second nodes is ordered in the transmission based on a priority associated with content of the received packet.

15. The method of claim 14, wherein each response from the first node to the plurality of second nodes is ordered in the transmission based on a priority associated with content of the received packet.

16. A method of communicating in a network, comprising:
receiving, at a first node, a communication from each of a plurality of second nodes, the communications being received via different respective channels; and
sending, by the first node, a transmission that contains a response to each communication that was successfully received from each of the plurality of second nodes, wherein the response to each of the plurality of second nodes is part of a single message sent by the first node;
wherein at least one of the responses in the single message includes network routing information usable by at least one of the plurality of second nodes to modify its network routing configuration for operation within the network,
wherein each response from the first node to the plurality of second nodes is ordered in the transmission based on at least one of (i) information contained in a received packet, and (ii) a priority associated with the node from which the received packet was received,
wherein the message sent by the first node comprises identifiers that respectively correspond to each of the plurality of second nodes whose communication was successfully received by the first node,
wherein the identifiers are arranged in the message in accordance with the order of each response from the first node to the plurality of second nodes in the transmission, and
wherein each response from the first node to the plurality of second nodes is ordered in the transmission based on information about a frequency hopping pattern in the network.

17. The method of claim 16, wherein each response from the first node to the plurality of second nodes is ordered in the transmission based on a priority associated with content of the received packet.

18. The method of claim 16, wherein the communication from each of the plurality of second nodes to the first node comprises data packets comprising identification headers of a source and a destination.

19. The method of claim 16, wherein each response from the first node to the plurality of second nodes comprises an acknowledgement.

* * * * *